US010556386B2

(12) United States Patent
 Zhao et al.

(10) Patent No.: US 10,556,386 B2
(45) Date of Patent: Feb. 11, 2020

(54) CONTROLLED HEATING FOR 3D PRINTING

(71) Applicant: HEWLETT-PACKARD DEVELOPMENT COMPANY, L.P., Houston, TX (US)

(72) Inventors: Yan Zhao, Palo Alto, CA (US); Jun Zeng, Sunnyvale, CA (US); Wei Huang, Palo Alto, CA (US); Lihua Zhao, Sunnyvale, CA (US); Eric G. Hanson, Burlingame, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 100 days.

(21) Appl. No.: 15/567,551

(22) PCT Filed: Jul. 30, 2015

(86) PCT No.: PCT/US2015/042894
§ 371 (c)(1),
(2) Date: Oct. 18, 2017

(87) PCT Pub. No.: WO2017/019088
PCT Pub. Date: Feb. 2, 2017

(65) Prior Publication Data
US 2018/0133975 A1     May 17, 2018

(51) Int. Cl.
*B33Y 30/00*     (2015.01)
*B33Y 50/02*     (2015.01)
(Continued)

(52) U.S. Cl.
CPC ........ *B29C 65/1429* (2013.01); *B29C 64/153* (2017.08); *B29C 64/165* (2017.08);
(Continued)

(58) Field of Classification Search
None
See application file for complete search history.

(56) References Cited

U.S. PATENT DOCUMENTS

2004/0003741 A1   1/2004  Iskra
2007/0241482 A1  10/2007  Giller et al.
(Continued)

FOREIGN PATENT DOCUMENTS

CN    103842157    6/2014
JP    1998211658   8/1998
(Continued)

OTHER PUBLICATIONS

Teles, et al; "3D Metal-Plastic Printer for Fabrication of Antennas on Custom and Flexible Surfaces"; Mar. 4, 2015.
(Continued)

*Primary Examiner* — Mary Lynn F Theisen
(74) *Attorney, Agent, or Firm* — HP Inc. Patent Department

(57) ABSTRACT

In one example, a method for printing a three-dimensional (3D) object is described. The method may include a processor depositing a layer of a sinterable material on a support member, and preheating the layer of the sinterable material using a moveable radiation source. The method may further include the processor depositing a fusing agent on an imaged area of the layer of the sinterable material and fusing the imaged area of the layer of the sinterable material using the moveable radiation source.

20 Claims, 3 Drawing Sheets

(51) Int. Cl.
- *B33Y 10/00* (2015.01)
- *B29C 64/165* (2017.01)
- *B29C 64/153* (2017.01)
- *B29C 64/295* (2017.01)
- *B29C 64/393* (2017.01)
- *B29C 65/14* (2006.01)

(52) U.S. Cl.
CPC .......... *B29C 64/295* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2010/0244333 A1 | 9/2010 | Bedal et al. |
| 2012/0201960 A1 | 8/2012 | Hartmann et al. |
| 2014/0163717 A1 | 6/2014 | Das et al. |
| 2014/0314613 A1 | 10/2014 | Hopkinson et al. |
| 2014/0348692 A1 | 11/2014 | Bessac et al. |
| 2014/0363327 A1 | 12/2014 | Holcomb |

FOREIGN PATENT DOCUMENTS

| | | |
|---|---|---|
| JP | 2004306612 | 11/2004 |
| JP | 2009544501 | 12/2009 |
| WO | WO-2013021173 A1 | 2/2013 |
| WO | WO-2014074947 | 5/2014 |
| WO | WO-2015-108543 | 7/2015 |
| WO | WO-2015108543 A1 | 7/2015 |
| WO | WO-2015108546 A2 | 7/2015 |

OTHER PUBLICATIONS

Nelson, et al; "Effect of Process Conditions on Temperature Distriution in the Powder Bed During Laser Sintering of Polyamide-12"; Sep. 21, 2014.

CONTROLLED HEATING FOR 3D PRINTING

BACKGROUND

Three-dimensional (3D) printing is an additive manufacturing process in which successive layers of material are laid down to form three-dimensional objects from a digital model. In additive manufacturing, successive material layers are joined together by fusing, binding, or solidification through processes including sintering, extrusion, and irradiation. For example, a powder bed of a 3D object printing system needs to be pre-heated to a target temperature and maintained throughout the 3D object printing process. Currently, a dedicated heating source, e.g., a plurality of short wave infrared (IR) emitters is deployed in a 3D object printing system to perform this pre-heating process.

BRIEF DESCRIPTION OF THE DRAWINGS

Various implementations will now be described, by way of example, with reference to the accompanying drawings, in which.

Throughout the drawings, identical reference numbers designate similar, but not necessarily identical, elements.

DETAILED DESCRIPTION

Figure 1:
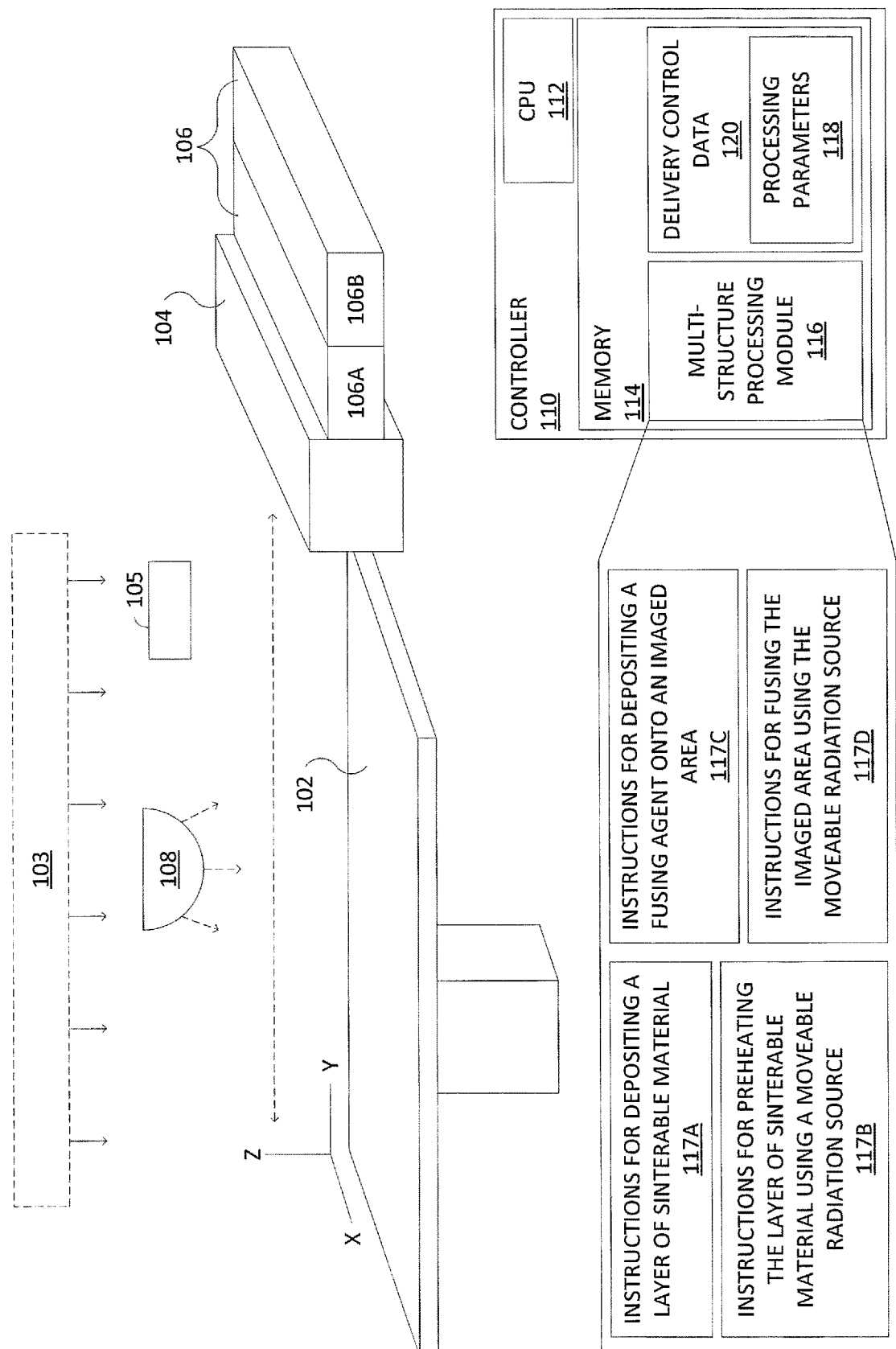
FIG. 1 illustrates an example of a three-dimensional (3D) printing system for manufacturing multi-structured 3D objects.

In some examples of three-dimensional (3D) printing, 3D objects are formed using thermal inkjet arrays and the like. During 3D printing, a layer of a sinterable material (e.g., a powder) is exposed to radiation, such that the sinterable material is fused and hardened to become a layer of a 3D object. In some examples, a coalescent or fusing agent is selectively deposited (or "printed") in contact with a selected region of the sinterable material. The fusing agent is capable of penetrating into the layer of sinterable material and spreading onto the exterior surface of the sinterable material. The fusing agent is capable of absorbing radiation (e.g., thermal radiation, broadly referred herein as heat), which in turn melts or sinters the sinterable material that is in contact with the fusing agent. This causes the sinterable material to fuse, bind, cure, etc., to form a layer of the 3D object. Repeating this process with numerous layers of sinterable material causes the layers to be joined together, resulting in the formation of the 3D object.

In some 3D printing systems, a support member (e.g., also known as a powder bed) is preheated (broadly heating) to a certain target temperature and maintained throughout the 3D printing process. Some systems use dedicated fixed heating sources, e.g., a plurality of short wave infrared (IR) emitters is deployed in a 3D object printing system to perform this pre-heating process. These statically fixed short wave IR emitters are costly and increase the overall cost of the 3D printing systems. Furthermore, there are drawbacks in using short wave IR emitters in the 3D printing systems.

For example, the short wave IR emitters are often deployed statically in an overhead configuration that is quite far from the sinterable material surface (e.g., the powder surface) due to clearance requirements for the printing station and the radiation source (e.g., a fusing lamp). Thus, the IR radiations dissipate when travelling through the large air gap separating the short wave IR emitters and the sinterable material surface which lowers the heating efficiency of the 3D printing system. Furthermore, the short wave IR emitters will radiate the printing station during the printing stage. This unnecessary heating of the printing station negatively impacts the health of the printing heads and may shorten the lifespan of the printbar of the printing station. Furthermore, as the size of the powder table of a 3D printing system is scaled ever higher to provide the ability to print larger 3D objects, there will be a need to increase the number of these fixed short wave IR emitters, thereby increasing the overall cost of large 3D printing systems. Finally, the power consumption of the 3D printing systems will also increase as well due to the increase in the number of short wave IR emitters that will be needed in providing larger 3D printing systems.

In one example, the present disclosure provides a method and apparatus where short wave IR emitters are omitted from the 3D printing systems. Instead, the present disclosure employs a heating method where the radiation source that is used for the fusing process is further used to heat the sinterable material surface as well. In other words, the fusing radiation source is used to replace the statically fixed short wave IR emitters.

Examples of three-dimensional (3D) printing disclosed herein enable a 3D printing system to entirely omit the use of statically fixed short wave IR emitters tasked with heating the sinterable material surface. Instead, the movement of the radiation source is selectively controlled to provide heating of the sinterable material surface in addition to the fusing process.

In one example, a method of printing a three-dimensional (3D) object is described. The method may include a processor depositing a layer of a sinterable material on a support member, heating the layer of the sinterable material using a moveable radiation source, depositing a fusing agent on an imaged area of the layer of the sinterable material, and fusing the imaged area of the layer of the sinterable material using the moveable radiation source.

In another example, a system for printing a three-dimensional (3D) object is described. The system may comprise a support member, a first distributor to provide a sinterable material on the support member, a moveable radiation source for providing a radiation, a second distributor to provide a fusing agent and a controller. The controller is for executing instructions to perform operations comprising depositing a layer of the sinterable material on the support member, heating the layer of the sinterable material using the moveable radiation source, depositing the fusing agent on an imaged area of the layer of the sinterable material and fusing the imaged area of the layer of the sinterable material using the moveable radiation source.

In another example, a non-transitory computer-readable medium storing instructions which, when executed by a processor, cause the processor to perform operations is described. The operations comprises depositing a layer of a powder on a powder bed, heating the layer of the powder by using a moveable fusing lamp in a waveform, depositing a fusing agent on an imaged area of the layer of the powder, and fusing the imaged area of the layer of the powder using the moveable fusing lamp.

FIG. 1 illustrates an example of a 3D printing system 100 without according to an example implementation of the present disclosure. The 3D printing system 100 includes no statically fixed short wave IR emitters. Instead, the example 3D printing system 100 enables the performance of the various 3D printing operations with just the radiation source that is used in the fusing process.

As shown in FIG. 1, the 3D printing system 100 includes a support member 102, e.g., a powder bed. Support member 102 functions as a fabrication bed to receive and hold sinterable material (not shown in FIG. 1), e.g., polyamide powder, nylon powder and the like, for forming a 3D object, such as a multi-structured 3D object. In one example, the support member 102 has dimensions ranging from about 10 cm by 10 cm up to about 100 cm by 100 cm, although the support member 102 may have larger or smaller dimensions depending upon the 3D object that is to be formed or the overall size of the 3D printing system.

A sinterable material distributor 104 provides a layer of sinterable material onto the support member 102. Examples of suitable sinterable material distributors include a wiper blade, a roller, and combinations thereof. In some examples, a sinterable material distributor 104 may comprise a supply bed and fabrication piston to push the sinterable material onto the support member 102. Sinterable material can be supplied to the sinterable material distributor 104 from a hopper or other suitable delivery system. In the example system 100 as shown in FIG. 1, the sinterable material distributor 104 moves across the length (Y axis) of the support member 102 to deposit a layer of the sinterable material.

As described below, a first layer of sinterable material is deposited on the support member 102, followed by the deposition of subsequent layers of sinterable material onto previously deposited (and solidified) layers. Accordingly, support member 102 may be moveable along the Z axis such that when new layers of sinterable material are deposited, a predetermined gap is maintained between the surface of the most recently formed layer and the lower surface of an agent distributor 106, illustrated as fusing agent distributor 106a and detailing agent distributor 106b. In other examples, the support member 102 may be fixed along the Z axis and the agent distributor 106 may be movable along the Z axis to maintain such predetermined gap.

An agent distributor 106 delivers a fusing agent and/or a detailing agent via fusing agent distributor 106a (e.g., a print head) and detailing agent distributor 106b (e.g., a print head), respectively, in a selective manner onto portions of a layer of sinterable material provided on support member 102. For example, the fusing agent distributor 106a may deliver a fusing agent to selective portions of a layer of sinterable material while the detailing agent distributor 106b may deliver a detailing agent to the same portions and/or to other portions of the layer of sinterable material provided on the support member 102. Agent distributors 106a and 106b may include, respectively, a supply of fusing agent and detailing agent, or these agent distributors may be operatively connected, respectively, to a separate supply of the fusing agent and detailing agent.

While other types of agent distributors are possible and are contemplated herein, the agent distributor 106 (i.e., 106a, 106b) shown in the example 3D printing system 100 of FIG. 1 comprises one or multiple printheads, such as thermal inkjet printheads or piezoelectric inkjet printheads.

The printheads 106a and 106b may be drop-on-demand printheads or continuous drop printheads. The printheads 106a and 106b may be used to selectively deliver a fusing agent and a detailing agent, respectively, when such agents are in the form of a suitable fluid. In other examples of a printing system 100, a single printhead 106 may be used to selectively deliver both the fusing agent and the detailing agent. In such an example, a first set of printhead nozzles on the single printhead 106 can deliver the fusing agent, and a second set of printhead nozzles on the single printhead 106 can deliver the detailing agent. Each of the fusing agent and the detailing agent includes an aqueous vehicle, such as water, co-solvent(s), surfactant(s), etc., to enable it to be delivered via the printheads 106a and 106b.

Each printhead 106 can include an array of nozzles through which they can selectively eject drops of fluid. In one example, each drop may be on the order of about 10 pico liters (pl) per drop, although it is contemplated that a higher or lower drop size may be used. In some examples, printheads 106a and 106b can deliver variable size drops. In one example, the printheads 106a and 106b can deliver drops of the fusing agent and the detailing agent at a resolution ranging from about 300 dots per inch (DPI) to about 1200 DPI. In other examples, the printheads 106a and 106b can deliver drops of the fusing agent and the detailing agent at a higher or lower resolution. The drop velocity may range from about 5 m/s to about 24 m/s and the firing frequency may range from about 1 kHz to about 100 kHz. The printheads 106a and 106b may be an integral part of the printing system 100, or the printheads may be user replaceable. When the printheads 106a and 106b are user replaceable, the printheads may be removably insertable into a suitable distributor receiver or interface module (not shown).

As shown in FIG. 1, each of the agent distributors 106a and 106b has a length that enables it to span the whole width of the support member 102 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 102. In still other examples of the printing system 100, the agent distributors 106a and 106b may have a shorter length that does not enable them to span the whole width of the support member 102.

In some examples, agent distributors 106a and 106b are mounted on a moveable carriage to enable them to move bi-directionally across the length of the support member 102 along the illustrated Y axis. This enables selective delivery of the fusing agent and detailing agent across the whole width and length of the support member 102 in a single pass. In other examples, the support member 102 can move relative to the agent distributors 106a and 106b as they remain in a fixed position.

As used herein, the term "width" generally denotes the shortest dimension in the plane parallel to the X and Y axes shown in FIG. 1, and the term "length" denotes the longest dimension in this plane. However, in other examples the term "width" may be interchangeable with the term "length." As an example, an agent distributor 106 may have a length that enables it to span the whole length of the support member 102 while the moveable carriage may move bi-directionally across the width of the support member 102.

In examples in which the agent distributors 106a and 106b have a shorter length that does not enable them to span the whole width of the support member 102, the distributors 106a and 106b may also be movable bi-directionally across the width of the support member 102 in the illustrated X axis. This configuration enables selective delivery of the fusing agent and detailing agent across the whole width and length of the support member 102 using multiple passes.

As shown in FIG. 1, the 3D printing system 100 includes a moveable radiation source 108 (e.g., a fusing lamp) to emit radiation. Moveable Radiation source 108 can be implemented in a variety of ways including, for example, as an IR, near-IR, UV, or visible curing lamp, IR, near-IR, UV, or visible light emitting diodes (LED), or lasers with specific wavelengths. The moveable radiation source 108 that is used will depend, at least in part, on the type of fusing agent that is used. The moveable radiation source 108 is attached, for example, to a carriage (not shown). The carriage allows for the movement of the radiation source 108 into a position that is adjacent to the support member 102. In different examples, the moveable radiation source 108 is to apply energy to a deposited layer of sinterable material, the fusing agent, and the detailing agent, to cause the solidification of portions of the sinterable material. In one example, the moveable radiation source 108 is a single energy source that is able to uniformly apply energy to the materials deposited onto support member 102. In another example, the moveable radiation source 108 may include a plurality of moveable radiation sources to uniformly apply energy to the deposited materials.

In some examples, the moveable radiation source 108 can apply energy in a substantially uniform manner to the whole surface of the layer of sinterable material deposited onto the support member 102. This type of moveable radiation source 108 may be referred to as an unfocused energy source. Exposing the entire layer of sinterable material to energy simultaneously may help increase the speed at which a three-dimensional object is generated.

In one example, a sensor 105, e.g., an IR sensor, is deployed to measure a surface temperature of the support member 102. More specifically, the sensor 105 can be controlled to measure the sinterable material surface temperature. In other words, the sensor 105 is able to provide temperature data of the sinterable material surface to allow the processor 112 the ability to apply various waveforms or passes of the moveable radiation source 108 over the support member 102 as described below.

It should be noted that statically fixed short wave IR emitters 103 are also shown in FIG. 1 using dashed lines. The presentation of these short wave IR emitters 103 in phantom is to illustrate their omission from the example 3D printing system 100 of the present disclosure.

As shown in FIG. 1, the example 3D printing system 100 includes a controller 110. The example controller 110 shown in FIG. 1 is suitable for controlling the printing system 100 to form a multi-structured 3D object using different processing parameters for each of the structures within the multi-structured 3D object. The application of different processing parameters to different portions of the sinterable material within a layer of sinterable material, and/or to different layers of sinterable material, enables the manufacture of multi-structured 3D objects whose structures can have different characteristics, such as different mechanical strengths, different color qualities, and so on.

Controller 110 generally comprises a processor 112 (e.g., a central processing unit (CPU)) and a memory 114, and may additionally include firmware and other electronics for communicating with and controlling the various components of the 3D printing system 100. Memory 114 can include both volatile (i.e., RAM) and nonvolatile memory components (e.g., ROM, hard disk, optical disc, CD-ROM, magnetic tape, flash memory, etc.). The components of memory 114 comprise non-transitory, physical, machine-readable (e.g., computer/processor-readable) media that provide for the storage of machine-readable coded program instructions, data structures, program instruction modules, JDF (job definition format), and other data and/or instructions executable by a processor 112 of the 3D printing system 100.

An example of instructions stored in memory 114 include instructions associated with multi-structure processing module 116, while an example of stored data includes delivery control data 120. Module 116 can include programming instructions executable by a processor 112 to cause the 3D printing system 100 to perform various general and/or specific functions such as the steps, blocks, or operations of methods 200, 300 and 400, as described below with respect to FIGS. 2, 3 and 4, respectively.

Figure 3:
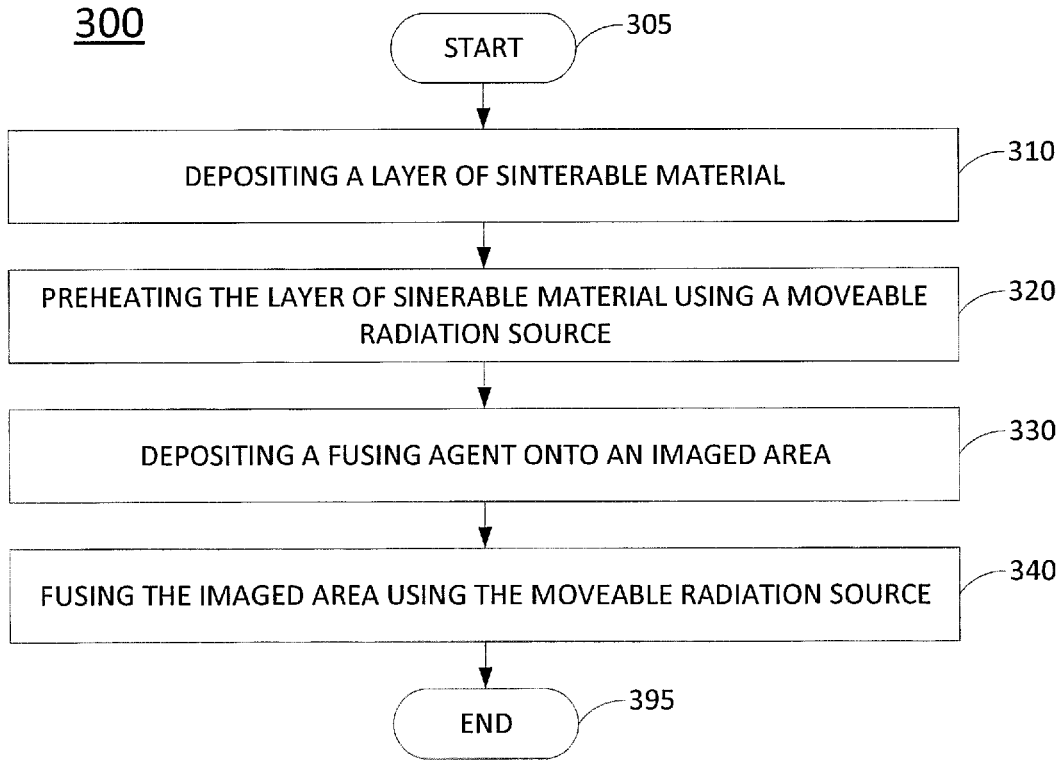
FIG. 3 illustrates a flowchart of an example method related to the production or printing of a 3D object in a 3D printing system.

For example, the multi-structure processing module 116 may comprise a plurality of instructions 117a-d in accordance with method 300 of FIG. 3. For example, instructions 117a comprise instructions for depositing a layer of sinterable material. Instructions 117b comprise instructions for preheating the layer of sinterable material using a moveable radiation source. Instructions 117c comprise instructions for depositing a fusing agent on to an imaged area. Instructions 117d comprise instructions for fusing the imaged area using the moveable radiation source.

The program instructions, data structures, modules, etc., stored in memory 114 may be part of an installation package that can be executed by processor 112 to implement various examples, such as examples discussed herein. Thus, memory 114 may be a portable medium such as a CD, DVD, or flash drive, or a memory maintained by a server from which the installation package can be downloaded and installed. In another example, the program instructions, data structures, modules, etc., stored in memory 114 may be part of an application or applications already installed, in which case memory 114 may include integrated memory such as a hard drive.

As noted above, controller 110 controls the 3D printing system 100 to form multi-structured 3D objects using different parameters for processing the different structures within the multi-structured 3D objects. In some examples, controller 110 uses delivery control data 120 and programming instructions from memory 114 (e.g., instruction module 116), to manage the application of sinterable material, fusing and detailing agents, and radiation within the 3D printing system 100 to facilitate the production of the multi-structured 3D objects.

For example, controller 110 may receive delivery control data 120 from a host system, such as a computer, and stores the data 120 in memory 114. Data 120 represents, for example, object files or print jobs defining multi-structured 3D objects to be printed. Such files defining 3D objects can include processing parameters 118 to be used to control various aspects of processing, such as the ink density of fusing agents and the selective delivery of fusing agents and detailing agents onto different portions of a layer of sinterable material and/or onto different layers of sinterable material.

In general, processing parameters 118 can include any parameter or set of parameters that can be adjusted by or within the 3D printing system 100 before or during a 3D printing process that can alter various characteristics of the 3D object being printed. For example, processing parameters 118 can include parameters that control the thickness of each layer of sinterable material used to form a 3D object, the amount of fusing agent jetted onto different portions of a layer of sinterable material, the amount of fusing agent jetted onto different layers of sinterable material, the color of ink applied to the fusing agent, the ink density of the fusing agent (e.g., the amount of ink within the fusing agent), the duration of radiation exposure to different portions of a layer of sinterable material, the duration of radiation exposure to different layers of sinterable material, the intensity of radiation applied from the moveable radiation source, and so on. Thus, processing parameters 118 can include parameters or sets of parameters that provide optimized processing profiles designed to achieve desired characteristics of the 3D object being printed.

In various examples as further described below, the processing parameters 118 include various methods for controlling the movement of moveable radiation source 108 to preheat the sinterable material surface. Broadly, the movement of moveable radiation source 108 comprises the direction, speed and frequency of the movement of moveable radiation source 108 across and over the support member 102.

The application of different processing parameters 118 to different layers of sinterable material, and/or to different portions of sinterable material within single layers of sinterable material, enables the manufacture of multi-structured 3D objects wherein the different structures within the 3D objects can be formed having varying characteristics such as different part densities, different mechanical strengths, and different color characteristics. Thus, data 120 includes print job data, commands and/or command parameters, defining 3D print jobs for multi-structured 3D objects for the 3D printing system 100. Using a print job from data 120, the processor 112 of controller 110 executes instructions (e.g., from module 116) to control components of the 3D printing system 100 (e.g., support member 102, sinterable material distributor 104, agent distributor 106, moveable radiation source 108) to form multi-structured 3D objects, one layer at a time, through a 3D printing process described in greater detail herein below.

Referring again to FIG. 1, the multi-structure processing module 116 comprises programming instructions executable to control the application of layers of sinterable material onto the support member 102 in accordance with delivery control data 120. In addition, instructions from module 116 are executable to control the application of a fusing agent onto selective portions of the sinterable material layers that "image" or define cross sections of a 3D object in accordance with delivery control data 120. For example, executing instructions from module 116, controller 110 can cause a printhead 106a to jet (i.e., eject, deposit, apply) fusing agent in a liquid form onto selected portions of a layer of sinterable material in order image/define a cross section of a 3D object in accordance with control data 120. In accordance with processing parameters 118 and other control data 120, the fusing agent can be applied in different amounts and with different ink intensities to different portions of a layer of sinterable material in order to facilitate the formation of different structures within a 3D object. In some examples, instructions from the module 116 further execute to control the application of a detailing agent onto the sinterable material layers. For example, executing instructions from module 116, controller 110 can cause a printhead 106b to jet detailing agent in a liquid form onto selected other portions and/or the same portions of the layer of sinterable material in accordance with delivery control data 120.

Execution of other instructions within the multi-structure processing module 116 further enables the controller 110 to control and execute the fusing process, i.e., to control the application of radiation from the moveable radiation source 108 onto each layer of sinterable material after the fusing agent (and in some cases, the detailing agent) has been jetted onto the sinterable material. Thus, the "fusing process" pertains to the operations of the moveable radiation source 108 after the fusing agent (and in some cases, the detailing agent) has been jetted onto the sinterable material. Thus, the "fusing process" of a particular layer of sinterable material is distinct from the "preheating of the sinterable material surface process" of the particular layer of sinterable material which occurs before the "fusing process" as described below.

For example, in accordance with the processing parameters 118 and other control data 120, the moveable radiation source 108 can be controlled to apply radiation of the preheating of the sinterable material surface process in various ways, such as varying the direction, speed and frequency of the movement of moveable radiation source 108 across and over the support member 102. For example, after the application of a new layer of sinterable material on the support member 102, the moveable radiation source 108 can be physically moved over the new layer of sinterable material to preheat the new layer of sinterable material prior to the application of the fusing process. Such preheating of the sinterable material surface process was previously performed by the use of statically fixed short wave IR emitters that are not present in the present 3D printing system of FIG. 1.

In turn, following the preheating of the sinterable material surface process, in accordance with processing parameters 118 and other control data 120, the moveable radiation source 108 can be controlled to apply radiation in a fusing process in various ways, such as with varying intensities and for varying durations. Such varying applications of radiation from moveable radiation source 108 can facilitate the formation of different structures within a 3D object that have different mechanical and visual characteristics. In the fusing process (where the fusing agent has been applied), radiation can be applied in multiple steps or operations, such as in a first pre-fusing step followed by a fusing step. In a first fusing step, radiation can be applied through a short duration sweep of the moveable radiation source 108 across a sinterable material layer to raise the temperature of a "just-imaged" area of the layer (i.e., the area that has just received the fusing agent) up to or slightly higher than that of the surrounding sinterable material. In a second fusing step, radiation can be applied in a longer duration sweep of the moveable radiation source 108 across the sinterable material layer to raise the temperature of the just-imaged area to a much higher temperature that thoroughly fuses the just-imaged area of the layer. In some examples, such radiation sweep durations and radiation intensities can be varied across the same sinterable layer and/or different sinterable layers.

As noted above, a controller 110 may additionally include firmware and other electronics for communicating with and controlling the various components of the 3D printing system 100. Accordingly, in some examples of the 3D printing system 100, the functionalities of instruction modules such as module 116 may be implemented as respective engines (e.g., a multi-structure processing engine) of the 3D printing system 100, each engine comprising any combination of hardware and programming to implement the functionalities of the engine.

Figure 2:
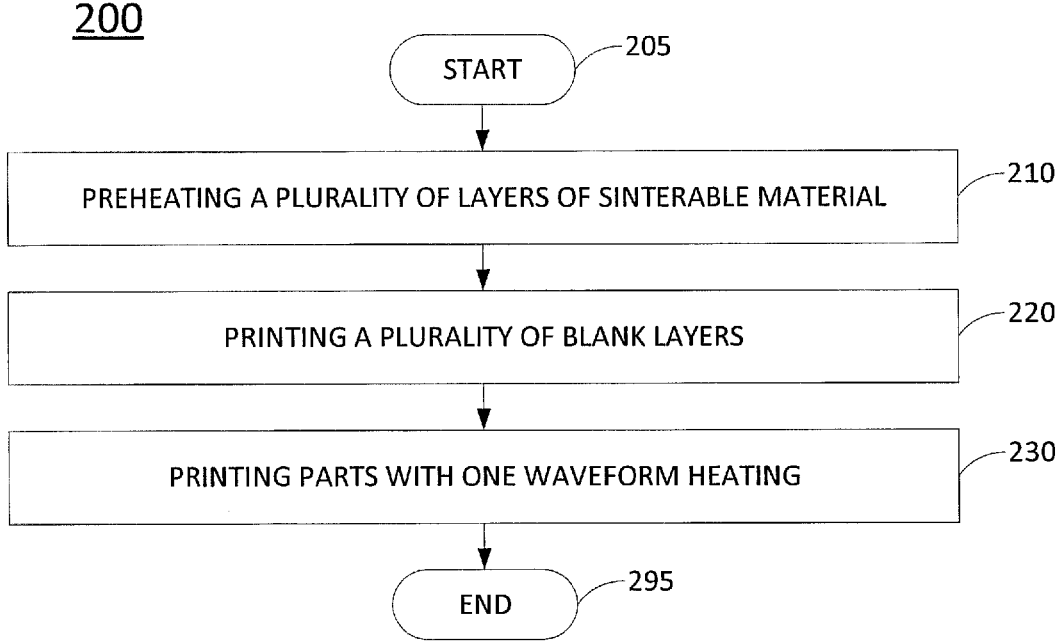
FIG. 2 illustrates a flowchart of an example method related to the production or printing of a 3D object in a 3D printing system.

FIG. 2 illustrates a flowchart of a first example method 200 related to the production or printing of a 3D object in a 3D printing system. The method 200 may be performed, for example, by various components of the system 100 of FIG. 1. For example, the method 200 will now be described in terms of an example where blocks of the method are performed by a processor, such as processor 112 in controlling various components of the system 100 in FIG. 1. As used in connection with the description of FIG. 1, the term "processor" may also include multiple processors, or hardware logic units, e.g., an application specific integrated circuit (ASIC), a programmable logic device (PLD), such as a field programmable gate array (FPGA), and so forth.

The method 200 begins in block 205. In block 210, the processor controls the moveable radiation source 108 (e.g., the fusing lamp) to preheat (or broadly heat) a plurality of layers of sinterable material (e.g., a plurality of layers of powders). For example, a plurality of layers of sinterable material is deposited onto the support member 102 (e.g., a powder table) prior to the printing of a 3D object. However, for each layer of sinterable material, the moveable radiation source 108 is controlled by the processor to apply radiation (e.g., thermal radiation) to each layer of sinterable material before the next layer of sinterable material is deposited onto the support member 102. In one example, a different amount of thermal radiation is applied to each of the plurality of layers of sinterable material.

To illustrate, in one example five (5) layers of sinterable material are to be deposited onto the support member 102. After the first layer of sinterable material is deposited onto the support member 102, the processor will cause the moveable radiation source 108 to apply six (6) waveforms of thermal radiation onto the first layer of sinterable material. After the predetermined number of waveforms of thermal radiation has been applied, the second layer of sinterable material is deposited onto the support member 102. The processor will cause the moveable radiation source 108 to apply five (5) waveforms of thermal radiation onto the second layer of sinterable material. Thus, one less waveform of thermal radiation is applied for each subsequent deposition of a new layer of sinterable material. It should be noted that this example is illustrative and should not be interpreted as a limitation of the present disclosure.

In one example, a single waveform of thermal radiation comprises the movement of the moveable radiation source 108 over the support member 102, e.g., in the y-axis or x-axis in two passes (broadly a first pass and a second pass), e.g., moving the moveable radiation source 108 from a left to right direction and then moving the moveable radiation source 108 from the right to left direction back to the moveable radiation source's original starting position or vice versa. It should be noted that the terms "left to right direction" and "right to left direction" are relative terms depending on the original orientation of the moveable radiation source. In other words, depending on the starting position of the moveable radiation source 108, the processor 112 may move the moveable radiation source 108 in any manner in the y-axis or x-axis as shown in FIG. 1.

In block 220, the processor prints a plurality of blank layers, e.g., the processor interacting with the various components of FIG. 1 to bring about the printing of the plurality of blank layers. For example, ten (10) blank layers can be printed using one waveform of heating in the fusing process. Broadly, the printing of each layer comprises the deposition of a layer of sinterable material, followed by a preheating of the sinterable material, followed by the deposition of a fusing agent, and then concluded with the fusing of the imaged area (e.g., the area where the fusing agent has been applied). The printing of a plurality of blank layers provides thermal uniformity prior to the actual printing of the desired 3D object. It should be noted that any number of blank layers can be printed.

In block 230, the processor prints various parts of the 3D object using one waveform of heating in the fusing process. For example, each part of the 3D object may comprise a plurality of fused layers of the sinterable material. The method 200 then ends in block 295.

FIG. 3 illustrates a flowchart of a second example method 300 related to the production or printing of a 3D object in a 3D printing system. The method 300 may be performed, for example, by various components of the system 100 of FIG. 1. It should be noted that method 300 can be performed by each of the blocks 220 and 230 of FIG. 2. For example, the method 300 will now be described in terms of an example where blocks of the method are performed by a processor, such as processor 112 in controlling various components of the system 100 in FIG. 1. As used in connection with the description of FIG. 1, the term "processor" may also include multiple processors, or hardware logic units, e.g., an application specific integrated circuit (ASIC), a programmable logic device (PLD), such as a field programmable gate array (FPGA), and so forth.

The method 300 begins in block 305. In block 310, the processor deposits, applies or coats a layer of sinterable material onto the support member 102, e.g., a powder bed. For example, the processor 112 executes the pertinent instructions to cause the sinterable material distributor 104 to provide a layer of sinterable material onto the support member 102.

In block 320, the processor preheats (or broadly heats) the layer of sinterable material that has been deposited onto the support member 102 using a moveable radiation source 108.

In block 330, the processor deposits or applies a fusing agent on to an imaged area, e.g., a predefined area on the support member where a part of the 3D object is to be printed.

In block 340, the processor fuses (or broadly heats) the imaged area on the support member 102 using the moveable radiation source 108. In other words, the same moveable radiation source 108 is used in the "preheating" block 320 as in the current "fusing" block 340. The method 400 ends in block 395.

Figure 4:
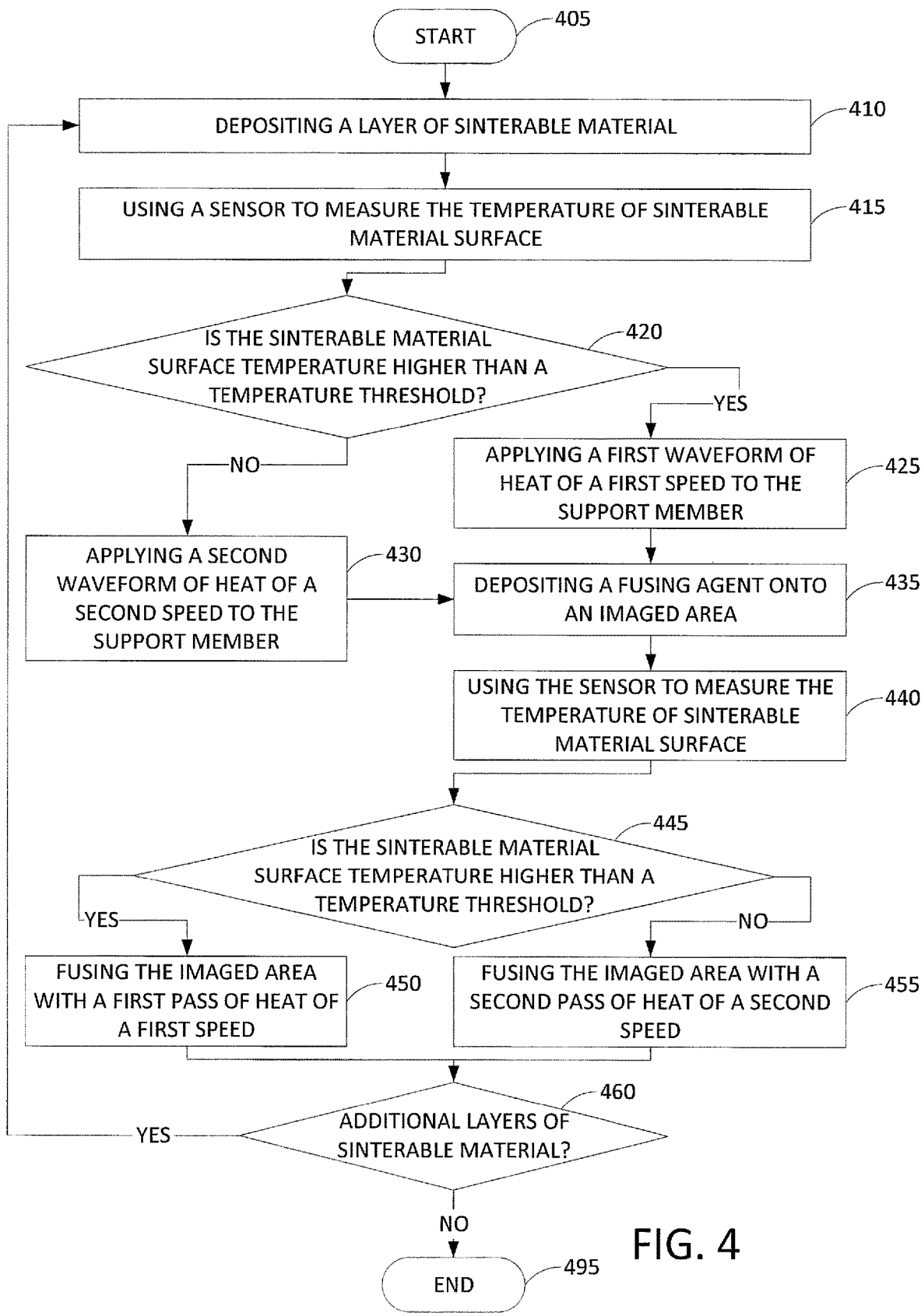
FIG. 4 illustrates a flowchart of an example method related to the production or printing of a 3D object in a 3D printing system.

FIG. 4 illustrates a flowchart of a third example method 400 related to the production or printing of a 3D object in a 3D printing system. The method 400 may be performed, for example, by various components of the system 100 of FIG. 1. It should be noted that method 400 can be performed at each of the blocks 220 and 230 of FIG. 2. For example, the method 400 will now be described in terms of an example where blocks of the method are performed by a processor, such as processor 112 in controlling various components of the system 100 in FIG. 1. As used in connection with the description of FIG. 1, the term "processor" may also include multiple processors, or hardware logic units, e.g., an application specific integrated circuit (ASIC), a programmable logic device (PLD), such as a field programmable gate array (FPGA), and so forth.

The method 400 begins in block 405. In block 410, the processor deposits, applies or coats a layer of sinterable material onto the support member 102, e.g., a powder bed. For example, the processor 112 executes the pertinent instructions to cause the sinterable material distributor 104 to provide a layer of sinterable material onto the support member 102.

In block 415, the processor measures the temperature of the layer of sinterable material surface. For example, the processor 112 executes the pertinent instructions to take a temperature reading using the IR sensor 105.

In block 420, the processor determines whether the temperature of the layer of sinterable material surface is higher than a temperature threshold (broadly a first temperature threshold). In one example, the temperature threshold can be set between 120-123 degrees Celsius. It should be noted that the temperature threshold is selected in accordance with the type of sinterable material that is used or other printing parameters that are pertinent to the 3D object that is to be printed. If the temperature of the layer of sinterable material surface is higher than the temperature threshold, then the method 400 will proceed to block 425, otherwise the method 400 will proceed to block 430.

In block 425, the processor applies a first waveform of heat of a first speed to the support member for preheating (or broadly heating) the layer of sinterable material on top of the support member 102. For example, the processor 112 executes the pertinent instructions to cause the movement of the moveable radiation source 108 to pass over the support member 102. In one example, the first speed comprises moving the moveable radiation source 108 at a rate of 25-30 inch per second (ips) in each pass of the first waveform, where the first waveform comprises a single waveform of movement of the moveable radiation source 108. This first waveform can be deemed to be a "weak" waveform in the sense that the layer of sinterable material has a current measured temperature that does not require a high amount of preheating. It should be noted that the rate of 25-30 ips is only one example.

In block 430, the processor applies a second waveform of heat of a second speed to the support member for preheating (or broadly heating) the layer of sinterable material on top of the support member 102. For example, the processor 112 executes the pertinent instructions to cause the movement of the moveable radiation source 108 to pass over the support member 102. In one example, the second speed comprises moving the moveable radiation source 108 at a rate of 20-25 ips in each pass of the first waveform, where the second waveform comprises a single waveform of movement of the moveable radiation source 108. This second waveform can be deemed to be a "strong" waveform in the sense that the layer of sinterable material has a current measured temperature that does require a greater amount of preheating since the measured temperature is below the temperature threshold. It should be noted that the rate of 25-30 (ips) is only one example.

In block 435, the processor deposits or applies a fusing agent on to an imaged area, e.g., a predefined area on the support member where a part of the 3D object is to be printed. For example, the processor 112 executes the pertinent instructions to cause the movement of the agent distributor 106 (i.e., 106a, 106b) to pass over the support member 102 for depositing the fusing agent.

In block 440, the processor measures the temperature of the layer of sinterable material surface with the deposited fusing agent. For example, the processor 112 executes the pertinent instructions to take another temperature reading using the IR sensor 105.

In block 445, the processor determines whether the temperature of the layer of sinterable material surface with the deposited fusing agent is higher than another temperature threshold (broadly a second temperature threshold). In one example, the second temperature threshold can be set between 130-135 degrees Celsius. It should be noted that the temperature threshold is selected in accordance with the type of sinterable material that is used or other printing parameters that are pertinent to the 3D object that is to be printed. If the temperature of the layer of sinterable material surface with the deposited fusing agent is higher than the temperature threshold, then the method 400 will proceed to block 450, otherwise the method 400 will proceed to block 455.

In block 450, the processor fuses the imaged area with a first pass of heat of a first speed, i.e., applies a first pass of heat of a first speed to the support member for fusing the layer of sinterable material. For example, the processor 112 executes the pertinent instructions to cause the movement of the moveable radiation source 108 to pass over the support member 102. In one example, the first speed comprises moving the moveable radiation source 108 at a rate of 18-24 inch per second (ips) in a single pass. This first pass can be deemed to be applying a "weak" power in the sense that the layer of sinterable material with the fusing agent has a current measured temperature that does not require a high amount of fusing heat. It should be noted that the rate of 18-24 ips is only one example. After block 450, the method 400 proceeds to block 460.

In block 455, the processor fuses the imaged area with a second pass of heat of a second speed, i.e., applies a second pass of heat of a second speed to the support member for fusing the layer of sinterable material. For example, the processor 112 executes the pertinent instructions to cause the movement of the moveable radiation source 108 to pass over the support member 102. In one example, the second speed comprises moving the moveable radiation source 108 at a rate of 14-18 inch per second (ips) in a single pass. This second pass can be deemed to be applying a "strong" power in the sense that the layer of sinterable material with the fusing agent has a current measured temperature that does require a greater amount of fusing heat. It should be noted that the rate of 14-18 ips is only one example. After block 455, the method 400 proceeds to block 460.

At block 460, the processor determines whether additional layers of sinterable material are to be deposited. If another layer of sinterable material is to be deposited, then the method 400 will proceed to block 410, otherwise the method 400 will end in block 495.

It should be noted that terms such as "weak" and "strong" as used in the present disclosure are only illustrative and they are relative terms. In other words, these terms are used to indicate relative application of different rates under different detected conditions and should not be interpreted as a limitation of the present disclosure.

Furthermore, although the above disclosure indicates that each waveform comprises at least two passes, it should be noted that the operating parameters that are set for each of the at least two passes may be the same or different. For example, the first pass of a single waveform may be set at the rate of moving the moveable radiation source at 21 ips, while the second pass of the same single waveform may also be set at the rate of moving the moveable radiation source at 21 ips. For another example, the first pass of a single waveform may be set at the rate of moving the moveable radiation source at 21 ips, while the second pass of the same single waveform may be set at the rate of moving the moveable radiation source at 19 ips, and so on. Furthermore, it should be noted that a waveform of moving the radiation source may comprise more than two passes, e.g., three passes, four passes and so on. In other words, in one example, a left to right direction movement or a right to left direction movement may require two staggered passes instead of a single pass and so on.

It should be noted that terms such as "first" and "second" as used in the present disclosure are only illustrative and they are merely labeling terms. In other words, these labeling terms are used to indicate different elements or parameters and do not necessarily imply a sequence of events unless specifically indicated as such.

It should be noted that although not explicitly specified, at least one of the blocks, functions, or operations of the methods 200, 300, and 400 described above may include storing, displaying, and/or outputting. In other words, any data, records, fields, and/or intermediate results discussed in the methods can be stored, displayed, and/or outputted to another device depending on the particular application. Furthermore, blocks, functions, or operations in FIGS. 2-4 that recite a determining operation, or involve a decision, do not necessarily imply that both branches of the determining operation are practiced. In other words, one of the branches of the determining operation can be deemed as optional.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the blocks, functions and/or operations of the above disclosed methods.

It will be appreciated that variants of the above-disclosed and other features and functions, or alternatives thereof, may be combined into many other different systems or applications. Various presently unforeseen or unanticipated alternatives, modifications, or variations therein may be subsequently made, which are also intended to be encompassed by the following claims.

What is claimed is:

1. A method of printing a three-dimensional (3D) object, the method comprising:
    depositing and heating a set of uniform blank layers of sinterable material on a support member;
    depositing, by a processor, a layer of the sinterable material on the set of uniform blank layers of sinterable material on the support member;
    heating, by the processor, the layer of the sinterable material using a moveable radiation source;
    depositing, by the processor, a fusing agent on an imaged area of the layer of the sinterable material; and
    fusing, by the processor, the imaged area of the layer of the sinterable material using the moveable radiation source.

2. The method of claim 1, wherein the sinterable material comprises a polyatnide powder.

3. The method of claim 1, wherein the sinterable material comprises a nylon powder.

4. The method of claim 1, further comprising: measuring a first temperature of a surface of the layer of the sinterable material after the depositing of the layer of the sinterable material on the support member.

5. The method of claim 4, wherein the heating comprises applying a first waveform of heat of a first speed when the first temperature of the surface of the layer of the sinterable material is above a first temperature threshold and applying a second waveform of heat of a second speed when the first temperature of the surface of the layer of the sinterable material is below the first temperature threshold.

6. The method of claim 1, further comprising: measuring a second temperature of the surface of the layer of the sinterable material after the fusing agent is applied.

7. The method of claim 6, wherein the fusing comprises applying a first pass of heat of a first speed over the imaged area of the layer of the sinterable material when the second temperature of the surface of the layer of the sinterable material after the fusing agent is applied is above a second temperature threshold.

8. The method of claim 6, wherein the fusing comprises applying a second pass of heat of a second speed over the imaged area of the layer of the sinterable material when the second temperature of the surface of the layer of the sinterable material after the fusing agent is applied is below a second temperature threshold.

9. The method of claim 1, wherein the set of uniform blank layers of sinterable material on the support member comprises ten uniform blank layers.

10. The method of claim 1, wherein heating the layer of the sinterable material using a moveable radiation source comprises multiple waveforms.

11. The method of claim 1, wherein heating the layer of the sinterable material using a moveable radiation source comprises multiple passes, wherein a first pass has different parameters from a second pass.

12. The method of claim 11, where the first pass and second pass differ in traverse speed.

13. A system for printing a three-dimensional (3D) object, the system comprising:
    a support member;
    a first distributor to provide a sinterable material on the support member;
    a moveable radiation source for providing a radiation;
    a second distributor to provide a fusing agent; and
    a controller to execute instructions to perform operations comprising:
        depositing a layer of the sinterable material on the support member using the first distributor;
        heating the layer of the sinterable material using the moveable radiation source;
        depositing the fusing agent on an imaged area of the layer of the sinterable material using the second distributor;
        fusing the imaged area of the layer of the sinterable material using the moveable radiation source, wherein a set of layers of the object are uniform and heated to provide thermal uniformity.

14. The system of claim 13, wherein the support member comprises a powder bed.

15. The system of claim 13, wherein the moveable radiation source comprises a fusing lamp.

16. The system of claim 13 wherein the set of layers of the object which are uniform and fused to provide thermal uniformity comprises ten layers.

17. A non-transitory computer-readable medium storing instructions which, when executed by a processor, cause the processor to perform operations, the operations comprising:
    depositing a layer of a powder on a powder bed;
    heating the layer of the powder by using a moveable fusing lamp in a waveform wherein the waveform comprises at least two passes of the moveable fusing lamp over the powder bed for heating the layer of the powder prior to the fusing and a first speed of a first pass of the at least two passes is different from a second speed of a second pass of the at least two passes;
    depositing a fusing agent on an imaged area of the layer of the powder; and fusing the imaged area of the layer of the powder using the moveable fusing lamp.

18. The non-transitory computer-readable medium of claim 17 wherein the instructions further cause the processor to: deposit, heat, and fuse a plurality of blank layers.

19. The non-transitory computer-readable medium of claim 17 wherein the plurality of blank layers comprises ten blank layers.

20. The non-transitory computer-readable medium of claim 17 wherein the fusing lamp has a single emitter.

* * * * *